United States Patent [19]
Newlin et al.

[11] Patent Number: 5,922,047
[45] Date of Patent: Jul. 13, 1999

[54] APPARATUS, METHOD AND SYSTEM FOR MULTIMEDIA CONTROL AND COMMUNICATION

[75] Inventors: Douglas J. Newlin, Geneva; Timothy M. Burke, Algonquin, both of Ill.

[73] Assignee: Motorola, Inc., Schaumburg, Ill.

[21] Appl. No.: 08/735,295

[22] Filed: Oct. 22, 1996

[51] Int. Cl.$^6$ .................................................. G06F 17/00
[52] U.S. Cl. ............................................................ 709/217
[58] Field of Search ..................... 345/200.47; 364/131, 364/133, 188, 185, 138; 340/825.08; 709/217

[56] References Cited

U.S. PATENT DOCUMENTS

| 5,621,662 | 4/1997 | Humphries et al. | 364/185 |
| 5,774,357 | 6/1998 | Hoffberg et al. | 364/188 |

OTHER PUBLICATIONS

X10 FAQ version May 16, 1996.
International Organization for Standarization Organization Internationale de Normalization MPEG–2 FAQ's; Leonardo Chiariglione Jul. 1997.
MCSI OmniBand White Paper; Jim Esserman, 1998.
MCSI News Release; Motorola Multimedia Invests in MCSI; Ron Katznelson; Mar. 8, 1996.

*Primary Examiner*—Ellis B. Ramirez
*Attorney, Agent, or Firm*—Nancy R. Gamburd; Gregory B. Gulliver

[57] ABSTRACT

A multimedia control apparatus (101, 201) provides for control over a plurality of media (145), including telephony, video conferencing, video display, home automation and control, and other communication systems such as voice mail. The multimedia control apparatus includes a network interface (110) coupleable to a network communication channel (103) for communication with a network (104); a user interface (120) responsive to receive a first control signal of a plurality of control signals; a plurality of media application modules (140), each media application module of the plurality of media application modules coupleable to a corresponding medium of a plurality of corresponding media (145); and a processor arrangement (130) having a plurality of operating modes. The processor arrangement (130) is responsive, through a set of program instructions and in response to the first control signal, to select a first media application module of the plurality of media application modules, to enter a first operating mode of the plurality of operating modes, the first operating mode corresponding to the first media application module, and with the processor arrangement being further responsive, in conjunction with the first media application module, to control the corresponding medium.

33 Claims, 3 Drawing Sheets

APPARATUS, METHOD AND SYSTEM FOR MULTIMEDIA CONTROL AND COMMUNICATION

CROSS-REFERENCE TO RELATED APPLICATIONS

This application is related to the following U.S. Patent Applications (collectively referred to as the "related applications"), each incorporated by reference herein, with priority claimed for all commonly disclosed subject matter:

Newlin et al., U.S. patent application Ser. No. 08/658,792, filed Jun. 5, 1996, entitled "Audio/Visual Communication System and Method Thereof", Motorola Docket No. PD05634AM (the "first related application");

Burke et al., U.S. patent application Ser. No. 08/706,100, filed Aug. 30, 1996, entitled "Apparatus, Method And System For Audio And Video Conferencing And Telephony", Motorola Docket No. PD05686AM (the "second related application");

Burke et al., U.S. patent application Ser. No. 08/715,887, filed Sep. 18, 1996, entitled "Videophone Apparatus, Method And System For Audio And Video Conferencing And Telephony", Motorola Docket No. PD05689AM (the "third related application");

Burke et al., U.S. patent application Ser. No. 08/725,602, filed Oct. 3, 1996, entitled "Apparatus, Method And System For Wireline Audio And Video Conferencing And Telephony", Motorola Docket No. PD05703AM (the "fourth related application");

Burke et al., U.S. patent application Ser. No. 08/726,320, filed Oct. 3, 1996, entitled "Videophone Apparatus, Method And System For Wireline Audio And Video Conferencing And Telephony", Motorola Docket No. PD05725AM (the "fifth related application"); and Newlin et al., U.S. patent application Ser. No. 08/672,819, filed Jun. 28, 1996, entitled "ISDN Communication System and Method Thereof", Motorola Docket No. PD05677AM (the "sixth related application").

FIELD OF THE INVENTION

This invention relates in general to communications and control systems and, more specifically, to an apparatus and method for multimedia control and communication.

BACKGROUND OF THE INVENTION

The inventions disclosed in the various related applications provide for both telephony and for audio/video conferencing, utilizing a video access apparatus coupleable via a communications channel to a telecommunications network. In the second and third related applications, the preferred embodiment of the video access apparatus provides for both telephony and for audio/video conferencing utilizing a CACS protocol for communication with a primary station via hybrid fiber coaxial cable, and the primary station, in turn, provides connectivity to a telecommunications network and a cable television services infrastructure. In the fourth and fifth related applications, the video access apparatus provides for both telephony and for audio/video conferencing with direct wireline connectivity to a telecommunications network, utilizing a wireline interface suitable, for example, for connection to an Integrated Services Digital Network ("ISDN") and/or to a Public Switched Telephone Network ("PSTN").

In the preferred embodiments of the second and fourth related applications, video conferencing capability is provided utilizing ordinary or common equipment and devices typically found in consumer or subscriber premises, such as telephones, televisions, and video cameras (video camcorders). In the third and fifth related applications, such video conferencing capability is provided utilizing one or more videophone apparatuses. Common to the inventions of each of the related applications, however, is the use of one user interface to select and control the various media applications, such as selecting telephony or video conferencing. In the preferred embodiments, one or more telephones may be used to provide for entry of various control signals, into an audio user interface of the video access apparatus, to select the operating mode of the video access apparatus. For example, in the preferred embodiment, entry of a predetermined sequence (such as "**" of the DTMF tones) is utilized to select a video conferencing mode, with a telephony mode automatically and transparently selected in the absence of the predetermined sequence.

In addition to various media applications such as telephony, stereo or other audio, and video conferencing, other media (or multimedia) applications are being introduced into consumer or subscriber environments. For example, current technology includes AC (alternating current) power line signaling capability to provide various control functions for typical consumer or subscriber premise equipment, such as heating, ventilating and air conditioning equipment ("HVAC"), and appliances such as dishwashers, clothes washers, ovens, ranges, and coffee makers. Current technology, however, has provided only for separate and application specific control systems, such as a remote control for audio stereo, another remote control for video (television and VCR), separate telephones, a separate thermostat, and separate interfaces to control AC power line signaling. For example, current technology has not provided for a singular interface which controls digital video, analog video, video conferencing, and telephony functions. In addition, each of these application specific control systems often include features redundantly found in other control systems, such as each having a separate information display, such as separate thermostat LCDs and separate audio stereo LCDs.

Other prior art multimedia systems have largely been computer based, requiring either personal computers or workstations which are configured additionally with multimedia computer processing boards, multimedia software or other programming, and specified audio/visual conferencing equipment, such as a video camera and microphone. In these computer-based multimedia systems, multimedia control is provided only for the computer-based multimedia applications via, for example, a mouse or keyboard, and do not provide for control over other, more diverse media applications. In addition, such multimedia control is typically limited to the specific location of the designated computer, and cannot operate from more than one designated node or location within the user premises.

Accordingly, a need has remained for a singular or integrated apparatus and corresponding method capable of providing control functions over multiple and diverse media applications. Such a multimedia control apparatus should also preferably operate at more than one designated node or location within the user premises, or may be mobile, or may be configured as needed for additional locations. In addition, such a singular or integrated apparatus should be user friendly, relatively or comparatively less expensive, and should avoid device or equipment redundancy.

DETAILED DESCRIPTION OF THE INVENTION

As mentioned above, a need has remained for a singular or integrated apparatus capable of providing control functions over multiple and diverse media applications (also referred to as "multimedia"). The present invention provides for such a singular (or integrated) apparatus and method capable of providing such diverse multimedia control functions. In the preferred embodiment, the multimedia control apparatus provides for control over a plurality of media applications including telephony, video conferencing, analog video, digital video, and AC power line signaling (for control over premise or subscriber equipment such as HVAC, lighting, security, and entertainment). Also in the preferred embodiment, any connected telephone becomes a multimode telephone, providing the physical interface for telephony functions and for multimedia control functions. In addition, the multimedia control apparatus in accordance with the present invention is user friendly, is relatively or comparatively less expensive, and avoids device or equipment redundancy.

Figure 1:
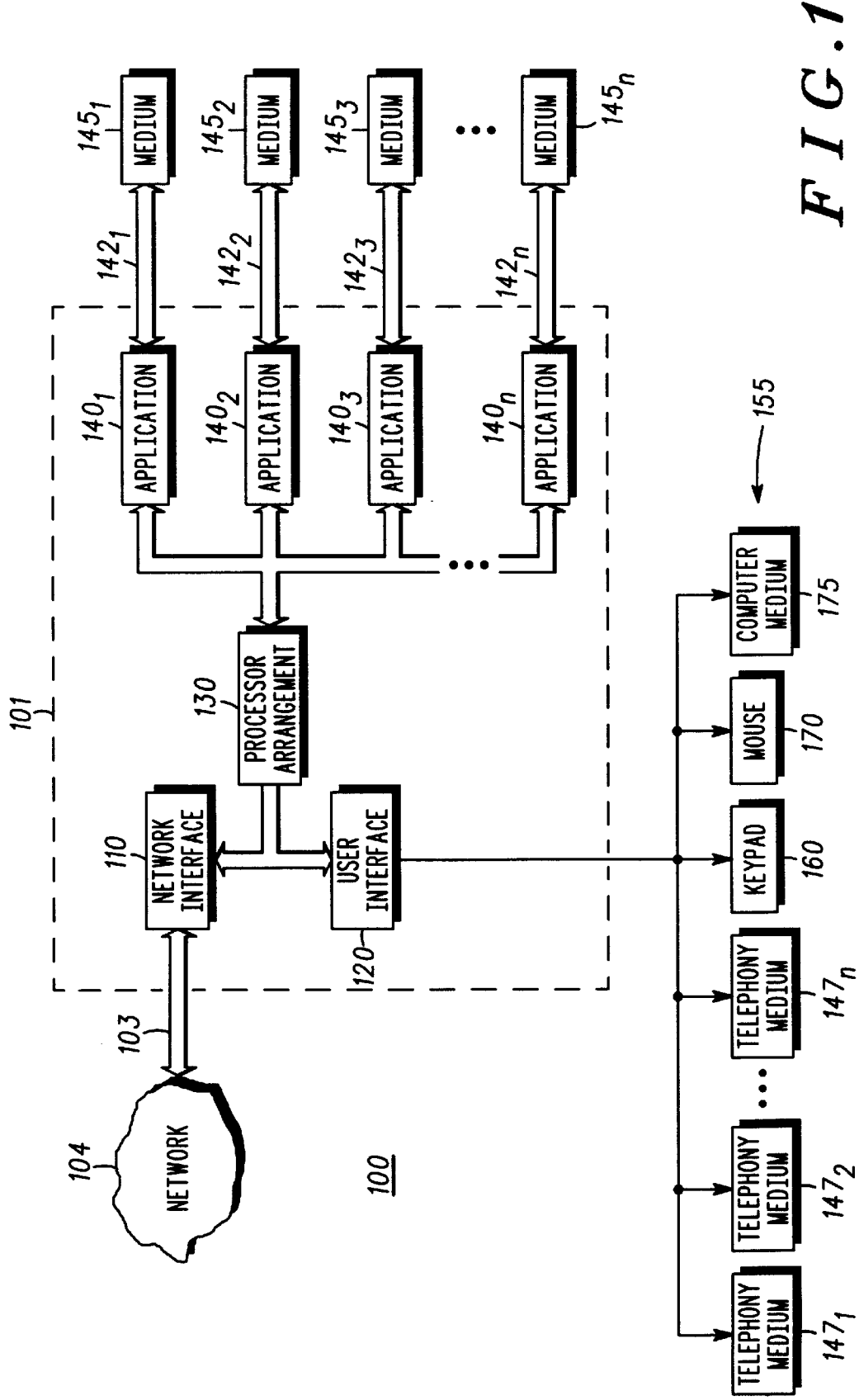
FIG. 1 is a block diagram illustrating an embodiment of a multimedia control apparatus and multimedia control system in accordance with the present invention.

FIG. 1 is a block diagram illustrating an embodiment of a multimedia control apparatus 101 and multimedia control system 100 in accordance with the present invention. As illustrated in FIG. 1, the multimedia control system 100 includes the multimedia control apparatus 101 and one or more media 145 (such as medium $145_1$ through medium $145_n$ (collectively media 145)) or telephony media 147 (such as telephony medium $147_1$ through telephony medium $147_n$ (collectively telephony media 147)). The various media 145 include, for example, video conferencing, video programming and video access control, home or premise automation and control, and voice mail and other messaging systems, with telephony media 147 being a special case or specific subset of media 145. When the media 145 are limited to video conferencing and to telephony, the multimedia control apparatus 101 is substantially and effectively identical to the various video access apparatuses disclosed in the related applications.

Continuing to refer to FIG. 1, the multimedia control apparatus 101 is coupleable, via a network interface 110, to a first, network communication channel 103 for communication with a network 104, and referred to as a network communication channel 103 to distinguish it from other communication channels of the multimedia control system 100, such as those utilized to communicate with the various media 145, which are referred to as media communication channels 142. The network communication channel 103 may be wireline, such as one or more twisted pair wires, may be cable, such as hybrid fiber coaxial cable, may be wireless, such as for cellular or other radio frequency transmissions, or may be of any other appropriate communications medium. The network 104, as disclosed in the fourth and fifth related applications, for example, may be a public switched telephone network ("PSTN") for ordinary telephony and analog data communications (also referred to as POTS, for plain old telephone service), or may be an Integrated Services Digital Network ("ISDN") for digital voice and data communications, or any combination of such existing or future telecommunications networks. For such wireline networks, the network communication channel 103 will usually be coupled to the network 104 through a local digital or analog switch (not illustrated). In addition, as disclosed in the second and third related applications, when a CACS communication protocol is implemented, the network communication channel 103 may be coupled to the network 104 via a primary station, which among other things provides one or more network interfaces utilizing other or additional protocols, such as various ISDN protocols, and also provides for connection to CATV (cable television) services infrastructure. The network 104 may also be an electric power network, such as that provided by an electric utility, which may also utilize various forms of communication and signaling such as PLC (power line carrier) for purposes such as variable rate, time of day billing. In such case, the network communication channel 103 may also include alternating current (AC) power lines, as discussed in greater detail below with reference to FIG. 2.

The multimedia control apparatus 101 illustrated in FIG. 1 includes various features or components disclosed and discussed in detail in the related applications, including the network interface 110, the processor arrangement 130, and the user interface 120. Depending upon the implementation of the multimedia control system 100, such as wireline, cable or wireless, the network interface 110 of the multimedia control apparatus 101 will vary accordingly. For example, for cable applications, as disclosed in the second and third related applications, the network interface 110 be a cable network interface and will include a CATV transceiver and a communications ASIC (application specific integrated circuit), which perform various functions, respectively, such as radio frequency (RF) modulation and demodulation and CACS protocol encoding and decoding. For wireline applications, as disclosed in the fourth and fifth related applications, the network interface 110 will include a telephony interface and/or an ISDN interface, which perform various functions, respectively, such as analog telephony and analog modem functions (e.g., International Telecommunications Union (ITU) V.34 and V.34bis protocols), and implementation of various digital (ISDN) protocols for voice and data transmission (e.g., ITU Q.921 LAPD data link and Q.910 physical layer (interface) digital protocols). As discussed in the related applications, the network interface 110 is utilized to transmit and receive analog or digital video, audio, and other information and data (generally referred to as data), in any given format, protocol, or modulation scheme compatible with the network 104 and with any particular network connections or switches; such analog or digital signals are referred to herein as protocol signals, such as V.34 protocol signals or ISDN protocol signals. For example, for an analog POTS transmission, audio/video data (having been compressed and formatted utilizing ITU H.323 or H.324 protocols), is then further encoded and modulated utilizing ITU V.34 or V.34bis protocols. Also for example, when coupled to an ISDN via the network communication channel 103, the network interface 110 will transmit and receive data in accordance with the ISDN series of protocols (such as the Q.x series).

Continuing to refer to FIG. 1, the multimedia control apparatus 101 is coupleable to a plurality of media $145_1$ through $145_n$, via a corresponding media communication channel 142 (such as a first media communication channel $142_1$ through a $n^{th}$ media communication channel $142_n$.

For example, medium $145_1$ may be a television, with a corresponding first media communication channel $142_1$ being, for example, a typical television cable, such as a 75 Ohm coaxial cable. As discussed in greater detail below, the various media $145_1$ through $145_n$ are operated and controlled through corresponding media application modules $140_1$ through $140_n$ (collectively media application modules 140). In addition, the correspondence between the various media 145, the corresponding media communication channel 142, and the media application modules 140, may be, but in most instances will not be, a one-to-one correspondence. For example, one or more televisions, as media 145, may be coupled through one or more branches or terminations of a coaxial cable, as a first media communication channel $142_1$, to the multimedia control apparatus, and operated and controlled by a plurality of media application modules 140, such as a video conferencing module, a digital video module, and an analog broadband video module. Other media 145, such as home or premise automation and control, e.g., lighting, HVAC, premise entertainment and premise security, may be coupled via a premise AC power line, as a second media communication channel $142_2$, to the multimedia control apparatus, and operated and controlled by a single media application module 140, such as an AC power line signaling interface.

The various media application modules 140 are connected or coupled to a processor arrangement 130. The processor arrangement 130, in turn, is connected or coupled to the network interface 110 and to the user interface 120. The functions of each of these components is also discussed in detail in the related applications concerning telephony and video conferencing media applications. Various functions of each of these components is also discussed in greater detail below with reference to FIGS. 2 and 3. The user interface 120 is utilized for reception of a control signal of a plurality of control signals, such as a request to place a telephony call, a request to place an audio and video conference call, a request to perform AC line signaling, a request to display a digital video signal, a request to perform a video loop back function, and other control signals such as alerting signals of incoming telephony or audio and video conference calls. In the preferred embodiment, the user interface is implemented as a user audio interface 255 illustrated in FIG. 3 and as illustrated in the related applications. The processor arrangement 130, in conjunction with the media application modules 140, provide control functionality over the various media 145, and as explained in the related applications and in greater detail below, may be comprised of a single integrated circuit ("IC"), or may include a plurality of integrated circuits or other components connected or grouped together, such as microprocessors, digital signal processors, ASICs, associated memory (such as RAM and ROM), and other ICs and components. As a consequence, as used herein, the term processor arrangement should be understood to equivalently mean and include a single processor, or arrangement of processors, microprocessors, controllers, or some other grouping of integrated circuits which perform the functions discussed in greater detail below. For example, in the preferred embodiment, the processor arrangement 130 is implemented as illustrated in FIG. 2 and in the related applications as a microprocessor subsystem 260.

Continuing to refer to FIG. 1, through the user interface 120, the multimedia control apparatus 101 is coupled to one or more physical interfaces 155 (for a user to physically access the multimedia control apparatus for the input of one or more control signals), such as a plurality of telephony media $147_1$ through $147_n$ (collectively referred to as telephony media 147), to a keyboard 160, to a computer mouse 170, and to a computer medium 175. The user interface 120 is implemented preferably as the user audio interface 255 illustrated in FIG. 2 and in the related applications. The telephony media 147 are implemented preferably as telephones or as videophones, with physical input of the plurality of control signals provided through a telephone keypad as DTMF (dual tone multifrequency) or pulse dialing signals, and with audio input and output provided through a microphone and speaker of the various telephones (or videophones). In addition to or in lieu of the telephony media 147, the keyboard 160, the mouse 170, and/or the computer medium 175, may also be utilized to input the plurality of control signals.

As discussed in greater detail below, the methodology of the present invention may be programmed and stored, as a set of program instructions for subsequent execution, in the processor arrangement 130 and its associated memory and other equivalent components. The set of program instructions may also be stored in any storage device, such as a memory IC, a floppy disk, a CD ROM, or any other readable or executable media. In the preferred embodiment, the processor arrangement 130 is utilized, in conjunction with a stored set of program instructions and in response to any control signals entered by the user or received from the network 104, for a variety of functions. As a consequence, the processor arrangement 130 has a plurality of operating modes such as, for example, operating modes for ISDN data and voice transmissions, analog or digital video transmissions, video conferencing, POTS telephony, analog data transmission, or AC power line signaling. For example, for audio and video conferencing, the processor arrangement 130 is utilized (embodied as the microprocessor subsystem 260 and video telephony subsystem 265), as described in the related applications, first, to convert a received protocol signal (from the network interface 110) both to a baseband output video signal (to be modulated and transmitted to a television or other video display, as one or more of the media 145) and to an output audio signal; and second, to convert both a baseband input video signal (a demodulated input video signal having originated from a camera interface 235 illustrated in FIG. 2 and the related applications) and an input audio signal, to a second protocol signal (to be modulated or formatted and transmitted by the network interface 110 to the network 104). For other applications, the processor arrangement 130 may receive, via the user interface 120, a control signal entered by a user through, for example, one or more of the telephony media 147, and in response to the control signal and the set of (stored) program instructions, the processor arrangement 130 selects a first media application module of the plurality of media application modules 140, such as video conferencing, enters a first operating mode of the plurality of processor operating modes, with the first operating mode corresponding to the first media application module, such as a video conferencing operating mode, and in conjunction with the first media application module, the processor arrangement 130 controls the corresponding medium, such as a video display and video camera utilized for the videoconferencing.

Figure 2:
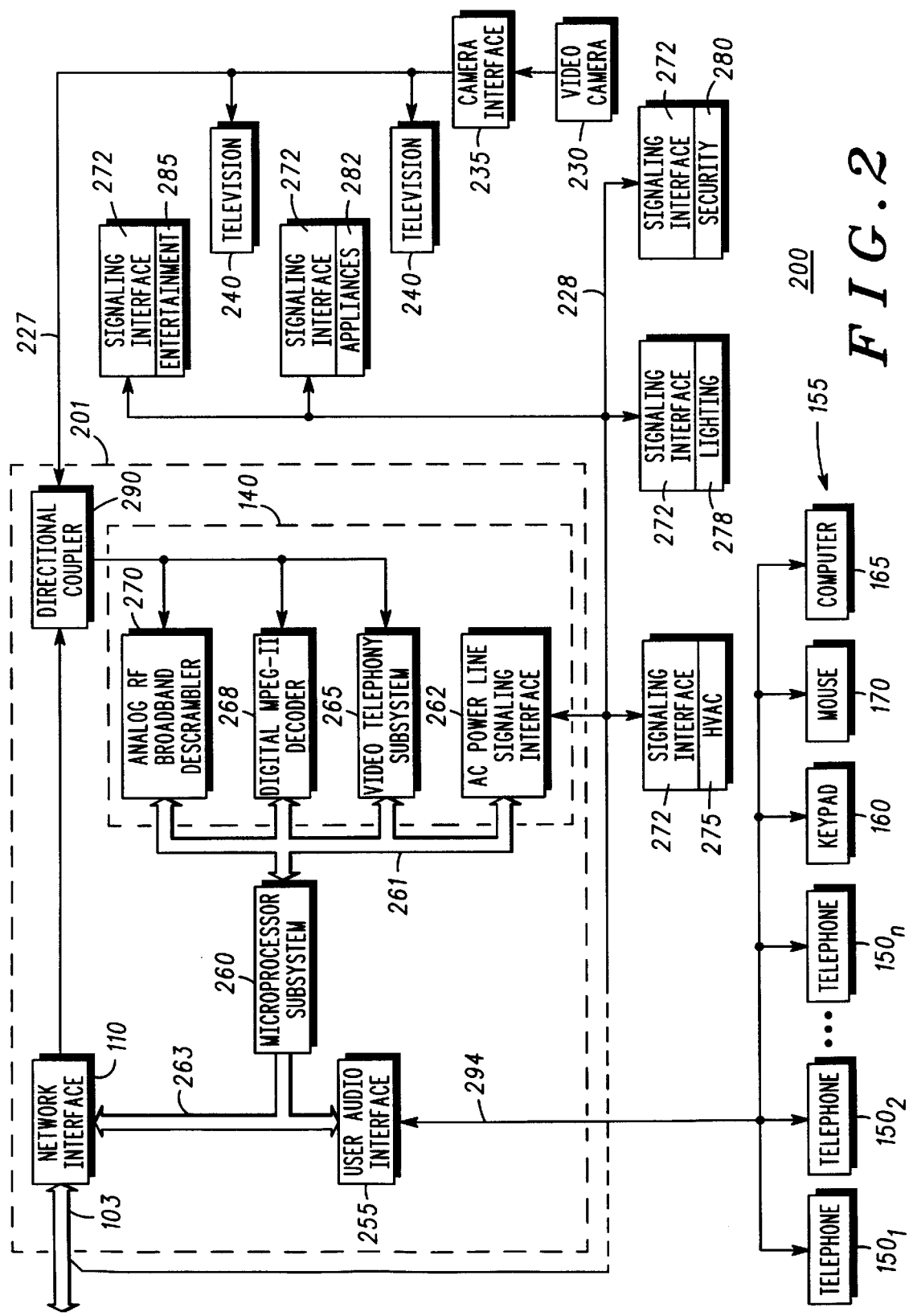
FIG. 2 is a block diagram illustrating a preferred embodiment of a multimedia control apparatus and multimedia control system in accordance with the present invention.

FIG. 2 is a block diagram illustrating a preferred embodiment of a multimedia control apparatus 201 and a multimedia control system 200 in accordance with the present invention. As discussed above, and as disclosed in detail in the related applications, the multimedia control apparatus 201 includes a network interface 110 (coupleable to the network communication channel 103 for communication with a network 104); a user audio interface 255 (as a user interface 120); and a microprocessor subsystem 260 (as or as part of the processor arrangement 130). As one of the media application modules 140, the multimedia control apparatus 201 includes a video telephony subsystem 265, for audio/ video conferencing. In this preferred embodiment, the multimedia control apparatus 201 is substantially similar to and may include all of the components of the various video access apparatuses disclosed in the related applications, such as the network interface 110, the user audio interface 255, the microprocessor subsystem 260, and the video telephony subsystem 265. The multimedia control apparatus 201 differs from the various video access apparatuses disclosed in the related applications in that the multimedia control apparatus 201 has additional media application modules 140, namely, an analog RF broadband descrambler 270, a digital MPEG-II decoder 268, and an AC power line signaling interface 262.

As disclosed in detail in the related applications, the video telephony subsystem 265 further includes one or more RF modulators and demodulators, and an audio/video compression and decompression subsystem (preferably utilizing the ITU H.32x series of protocols). The video telephony subsystem 265, coupled through a directional coupler 290 to a second communication channel 227 (as one of the media communication channels 142), transmits an RF output video (or audio/video) signal for display on one or more televisions 240 (as media 145), and receives an RF input video (or audio/video) signal from the camera interface 235 and video camera 230, for subsequent transmission to the network 104.

As illustrated in the related applications, the microprocessor subsystem 260 consists of a microprocessor or other processing unit, such as the Motorola MC68LC302, and memory, which includes random access memory (RAM) and read-only memory (ROM), and in the preferred embodiment, also includes flash programmable memory (such as flash EPROM or $E^2$PROM), with communication provided over the busses 261 and 263 to the network interface 110, the user audio interface 255, the video telephony subsystem 265, an analog RF broadband descrambler 270, a digital MPEG-II decoder 268, and an AC power line signaling interface 262. The read only memory also utilizes flash programmable memory, such that the memory contents may be downloaded from the network 104. As a consequence, different versions of operating software (program instructions), such as upgrades, may be implemented without modifications to the multimedia control apparatus 201 and without user intervention. The microprocessor subsystem 260 provides control and configuration of the various media application modules 140, ordinary telephony call processing, digital telephony call processing, and is also used to implement an ISDN or other protocol stack when required for analog or digital video calls, such as ITU Q.931 message signaling.

Continuing to refer to FIG. 2, the multimedia control apparatus 201 also includes, as additional media application modules 140 connected between the microprocessor subsystem 260 and the second communication channel 227, an analog RF broadband descrambler 270 and a digital MPEG-II decoder 268. The analog RF broadband descrambler 270 and a digital MPEG-II decoder 268 are utilized, respectively, to descramble analog video or decode and decompress digital video, which may have been transmitted via the network communication channel 103 from, for example, a CATV services infrastructure, for display on the televisions 240. The multimedia control apparatus 201 also includes, as another media application module 140, an AC power line signaling interface 262, coupled to a third communication channel 228, such as an AC power line in a consumer or customer premise. As discussed above, because such an AC power line may also communicate with the network 104, the third communication channel 228 may also be considered to be part of the first, network communication channel 103. In turn, the third communication channel 228 is coupled, through the signaling interfaces 272, to HVAC 275, lighting 278, premise security 280, appliances 282, and premise entertainment 285, as instances of media 145. In the preferred embodiment, the AC power line signaling interface 262 and the signaling interfaces 272 are programmable, and are or include an Echelon LonWorks system incorporating Motorola MC143120 or MC143150 Neuron ICs and Echelon power line transceivers PLT 20 or PLT 21, which provide signaling and control over the media connected to the third communication channel 228 (which is preferably an AC power line), such as turning lighting on and off, opening and locking doors, turning HVAC on or off, changing volume settings of a home entertainment system, setting a thermostat to a desired temperature, turning a sprinkler system on or off, etc. Similar or equivalent AC power line signaling interfaces 262 and signaling interfaces 272 are also available from other manufacturers.

As disclosed in detail in the related applications, the user audio interface 255 is designed to interface with standard household telephone sets, including wireless devices and speaker phones, such as telephones $150_1$ through $150_n$. The user audio interface 255 is intended to support both audio POTS calls and video calls and, in conjunction with the network interface 110, also supports analog modem functions. In addition, in conjunction with one of the physical interfaces 155, such as a telephone 150, keyboard 160, mouse 170, or computer 165, the user audio interface provides for entry of the various control signals utilized, for example, to select media applications or place telephony or video calls. In the preferred embodiment, any of the telephones 150 are utilized for entry of the various control signals, and POTS calls are processed in a "transparent" mode, such that placing and receiving telephone calls occur as if no video conferencing or other multimedia functions were present. Also in the preferred embodiment, video calls and multimedia functions are processed as exceptions, requiring a designated or predetermined dialing sequence entered by the user to invoke a video call or another media function.

The various telephones 150 utilized in the preferred embodiment may be any type of ordinary telephone, including cordless (portable) telephones, corded telephones, DTMF or pulse dialing telephones, videophones, or speaker phones. A particularly innovative feature of the present invention, as discussed in greater detail below, is that when connected to a multimedia control apparatus, an ordinary telephone becomes a multimode telephone having a plurality of operating modes, such as for telephony, the audio portion of video conferencing, and multimedia control functionality. Also as discussed in greater detail below, use of such a multimode telephone also provides for mobility of control, such that any multimode telephone, including portable telephones, may provide multimedia control. For example, a user in an upstairs bedroom of a home may utilizing a telephone to control the home thermostat located in a downstairs hallway.

As disclosed in the related applications, the user audio interface 255 preferably includes a SLIC circuit (Subscriber Loop Interface Circuit) which provides "BORSHT" functions for telephone service within the user premises; ring generation; an audio codec for the audio portion of a video call or telephony call, providing analog-to-digital conversions for voice digitizing of the input (voice) audio signal originating from the microphone portion of one or more of the telephones $150_1$ through $150_n$, and digital-to-analog conversion for voice recovery from an output digital voice data stream or signal (to create the output audio signal to the speaker portion of the telephones $150_1$ through $150_n$); and a programmable digital signal processor (DSP) and associated memory (referred to as the voice processing DSP in the related applications, to distinguish another DSP referred to as a video processing DSP). The DSP of the user audio interface 255 contains program memory and data memory to perform signal processing functions such as DTMF/dial pulse detection and generation, analog modem functions, call progress tone (dial tone, busy tone) generation, PCM-to-linear and linear-to-PCM (pulse code modulation) conversion, and speech prompt playback. The memory associated with the DSP, in the preferred embodiment, includes high density read only memory (referred to as speech ROM) containing PCM encoded (or compressed) speech segments used for interaction with the user, such as in prompting the user for keypad DTMF or dial pulse entry when in the video calling or other multimedia modes. In addition, optional speech random access memory may be used for user voice storage functions, and electrically alterable, programmable non-volatile (flash) memory for storage of programs (and updates) or algorithms.

The multimedia control apparatus 201 and, more specifically, the microprocessor subsystem 260 and the user audio interface 255 in the preferred embodiment, operate in a plurality of modes, which may vary according to the types of media applications supported. In the preferred embodiment, the plurality of operating modes may be divided into two groups, first, for POTS or other ordinary telephony, and second, for all other multimedia applications (such as video conferencing), which for ease of reference are referred to herein as non-telephony modes (with the understanding that such non-telephony modes include all non-ordinary POTS functionalities, such as videoconferencing (video telephony) or the audio portions of video conferencing). The telephony (POTS) mode is user transparent, as a default mode which is entered whenever the user goes off hook, for example, utilizing a telephone 150. As discussed in greater detail below, the video conferencing and other media application modes are entered as an exception, through the user entering (dialing) a specific, predetermined sequence which, in the preferred embodiment, is not recognized as a telephony sequence. The various modes may be entered by or through the user entering a control signal locally, such as through a telephone 150, or remotely, through control signals entered via a connection from the network 104 through the network interface 110. In the telephony (POTS) mode, the DSP of the user audio interface 255 generates the customary "dial" tone when the user telephone (of the telephones $150_1$ through $150_n$) goes off hook. The user then enters the dialing sequence via the keypad of a telephone 150, just as in known or customary telephone dialing. The DSP decodes the dialing digits and stores them in a calling memory buffer. Upon decoding the first two digits entered (which are not the first two digits of a specific predetermined non-telephony mode sequence), the DSP recognizes that the requested call is not for a non-telephony media application and, as a consequence, signals the microprocessor subsystem 260 to initiate a POTS call through the network interface 110. When the call is granted (by the network 104) and the audio link is established, the DSP forwards the stored digits to the local digital or analog switch and connects the audio paths between the user's telephone(s) 150 and the network 104. From this point on, the DSP will not decode any dialed digits and will simply pass through the input and output PCM digital voice data stream, until the user's telephone goes on hook and the call is terminated.

Alternatively for a telephony session, the user audio interface 255 may create or maintain a connection to a central office of a network 104, to provide transparency for telephony. Once the entry of the specific predetermined sequence for a non-telephony mode is detected, the user audio interface 255 breaks or terminates the central office connection, and enters the selected non-telephony mode, such as a video conferencing mode, under local control of the multimedia control apparatus 201.

As indicated above, in the preferred embodiment, the user initiates a non-telephony, multimedia application mode, such as a video conferencing mode, as an exception to the normal telephony mode, by entering a specific predetermined sequence which is recognized by the DSP of the user audio interface 255 as a non-telephony multimedia application mode sequence. Alternatively, a plurality of non-telephony mode sequences may be utilized, with each predetermined sequence specific to a selected non-telephony multimedia application mode, such as a video mode. This methodology is also discussed below with reference to the flow chart of FIG. 3. For example, for a non-telephony mode of the preferred embodiment, the first two digits of the specific, predetermined sequence are unique and specifically unused in a standard POTS call, such as "* *", and as a consequence, may specifically signal the DSP to enter a non-telephony multimedia application mode. Alternatively, other specific, predetermined sequences could be programmed by the user for recognition as a non-telephony mode by the DSP. Again, the various media application modes may be entered locally through one of the physical interfaces 155 or remotely via a connection through the network 104 and the network interface 110. Immediately after decoding the two special digits or other specific predetermined sequence indicating a non-telephony mode, the multimedia control apparatus 201 initializes the multimedia control process, such as through the DSP generating, playing or displaying a speech or video prompt sequence, such as "Please select a call option or press the '#' key for help", which is stored in the speech ROM portion of memory of the user audio interface 255. The action taken by the DSP will then be responsive to and depend upon the sequence entered or key pressed by the user following the initial prompt. For example, if the '#' key is pressed, the user may hear or see a menu of commands such as, for example, the following:

"To enter video conference mode, press 1"

"To enter video programming mode, press 2"

"To enter home or premise automation mode, press 3"

"To enter voice mail, press 4"

"To hear this menu again, press #'

Following the user's selection of the particular or specific non-telephony media application mode, such as a video conference mode, a sub-menu of commands is generated or displayed by the multimedia control system 201. For example, if the user selected a video conference mode, the user may hear or see a sub-menu of commands such as the following:

"To place a Directory call, press *"

"To update the call Directory, press 2"

"To place a manual video call, press 3"

"To mute the camera, press 4"

"To view the camera on your television, press 5"

"To hear this menu again, press #' Also for example, if the user selected a home automation mode, the user may hear or see a sub-menu of commands (or prompts) such as the following:

"To turn off all lights, press 1"
"To lower heat for sleeping, press 2"
"To set all home comfort settings for the parents, press 3"
"To arm the security system, press 4"
"To start the dishwasher, press 5"
"To start the lawn sprinklers, press 6"

Thus, in the preferred embodiment, an automated and user friendly prompting sequence is used to guide the user through the multimedia control operation or sequence, through a single (or integrated) physical interface, such as a telephone 150, rather than through multiple and different (and often confusing) interfaces. It should be noted that in the preferred embodiment, various directory features may be used to simplify the multimedia control process. For example, after the user goes off hook and presses the '*' key three times followed by a single digit '1', '2'. . . '9', a video conference call may be placed automatically using a sequence of numbers stored in a directory for that digit. This feature may be necessary or desirable under a variety of circumstances, for example, when an ISDN call may require the entry of two separate 10-digit numbers to connect the call through the network 104. Also as an option in the preferred embodiment, a more sophisticated system may store a simple name tag or other alphanumeric entry associated with the directory entry, created by the user, and played back to the user by the DSP of the user audio interface 255. For example, a prompt in response to making a directory call may be: "To call 'grandma', press 1"; "To call 'mother', press 2"; "To call 'work', press 3"; in which the speech segments "grandma", "mother", and "work" are spoken by the user, and recorded and stored in memory of the multimedia control apparatus 201. More sophisticated systems may include speaker/voice recognition techniques, to recognize the user selection, eliminating the need to press any keys on a telephone keypad or other manual entry of information into the user interface 120 or user audio interface 255. It should also be noted that video call control functions, such as camera muting, unmuting, and local playback (loop back), also may be selected with the same user interface.

Other sophisticated systems for user interaction may also include use of the television 240 or other video display for on-screen visual display of a menu of options, with corresponding entry of user control signals, such as call control and placement information, occurring in a variety of ways, such as through the keypad of the telephones 150, through a infrared remote control link with the multimedia control apparatus 201 (or 101), or through the input video path via the second communication channel 227. In this manner, in conjunction with a multimedia control apparatus 101 or 201, any of the physical interfaces 155, such as the telephone keypad or remote control link or mouse, coupled with a video display such as a television 240, may effectively form a distributed graphical user interface for multimedia control. For example, a keypad of a telephone 150 may operate as a cursor displayed on a television 240, selecting menu items displayed or navigating a series or sequence of windows. As a consequence, an embodiment of the present invention includes distributed graphical user interface, in which the distributed graphical user interface comprises, first, a physical interface 155, such as a telephone 150 or a mouse 170, with the physical interface responsive to an entry of a plurality of control signals; second, a video display such as a television 240, in which the video display is responsive to generate a first graphical display (such as a first window or a first menu), of a plurality of graphical displays, from a first video signal of a plurality of video signals; and third, a multimedia control apparatus (101 or 201) coupled to the physical interface 155 and to the video display via at least one communication channel (such as media communication channel 227), the multimedia control apparatus having a processor arrangement 130 responsive, through a set of program instructions and in response to a first control signal of the plurality of control signals, to generate the first video signal, the multimedia control apparatus (101 or 201) further having a modulator (such as the modulator included within the video telephony subsystem 265 and as shown in the related applications) to transmit the first video signal to the video display via the at least one communication channel. The graphical display of the distributed graphical user interface may also be altered or changed, for example, with the processor arrangement 130 being further responsive, through the set of program instructions and in response to a second control signal of the plurality of control signals, to generate a second video signal of the plurality of video signals, and with the modulator also being responsive to transmit the second video signal to the video display, and wherein the video display generates a second graphical display, of the plurality of graphical displays, from the second video signal.

These various methods of user prompting, on-screen display, and user feedback are especially useful to guide the user through the process of placing a video call, and help to make audio video conferencing and other multimedia applications especially user-friendly. In addition, these various methods also illustrate the "tri-ality" of the modes of a telephone 150 in the preferred embodiment, for telephony, for audio input and output, and for multimedia control.

Network configuration is yet another function which may be performed via a telephone 150 (or other physical interface 155) and the user audio interface 255, especially utilizing menu options displayed utilizing an on screen display (on a television 240 or other video display). For example, as disclosed in the sixth related application, automatic ISDN configuration capabilities, for example, for ISDN parameters such as switch type and SPID, may be implemented within the microprocessor subsystem 260 (or processor arrangement 130) and executed by the user via control functionality (as options entered by the user via the telephone 150 or other physical interface 155). In addition, for POTS video conferencing capability, V.x or other modem configuration parameters (such as auto or manual answer) may also be configured as options entered by the user via the telephone 150 or other physical interface 155.

Figure 3:
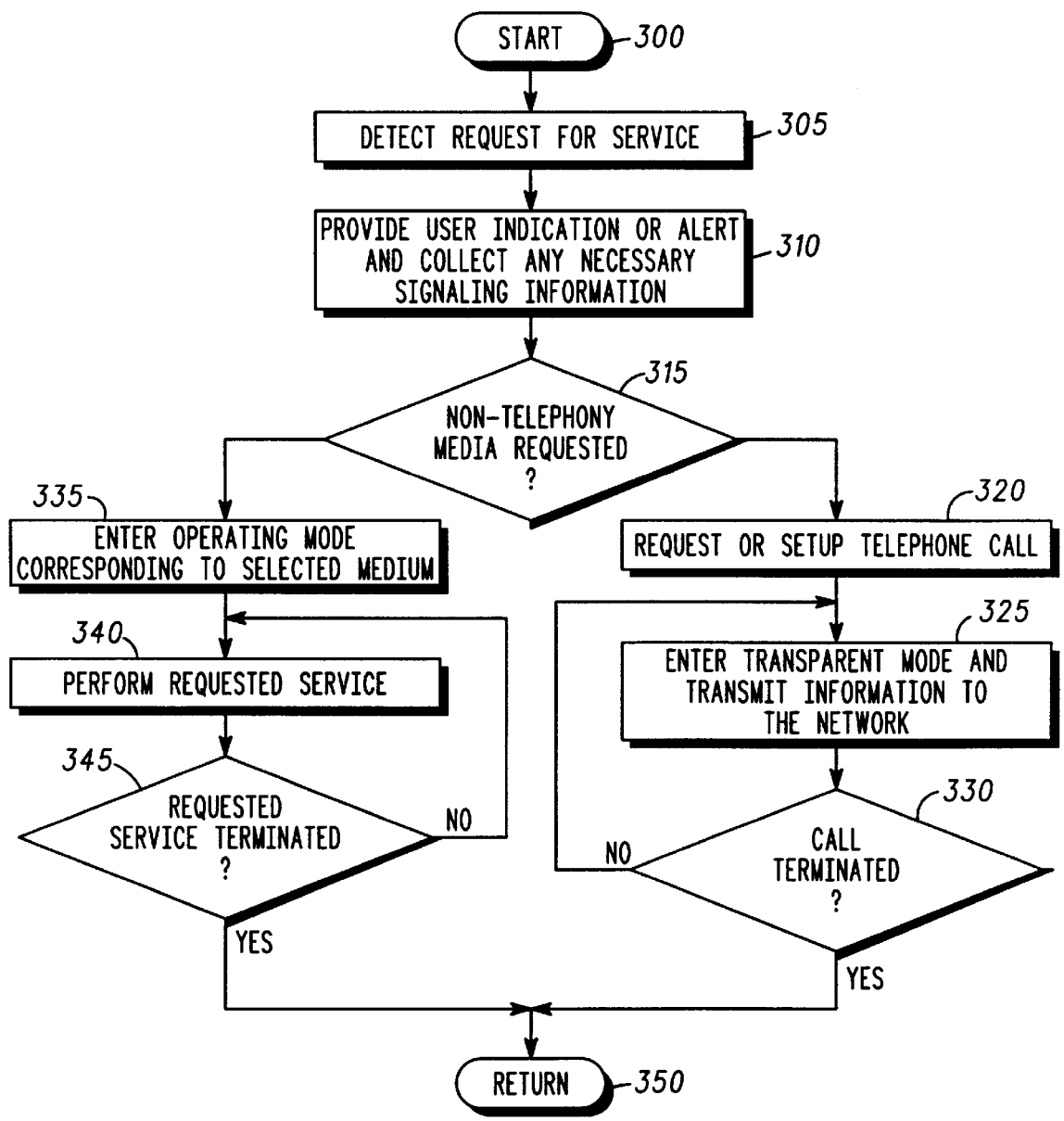
FIG. 3 is a flow diagram illustrating a multimedia control method in accordance with the present invention.

FIG. 3 is a flow diagram illustrating a multimedia control method in accordance with the present invention. FIG. 3 also illustrates the multiple roles or modes of a telephone, such as telephones $150_1$ through $150_n$, in the system of the present invention, including providing telephony (POTS), providing multimedia control, and providing the audio portion of a video conference call. Referring to FIG. 3, beginning with start step 300, a request for service is detected, step 305, such as going off hook or receiving an incoming alert signal. Next, in step 310, a user indication or alert is provided, such as a dial tone or an incoming ring signal, and signaling information is collected, such as DTMF digits of a phone number or "". When a non-telephony mode has been requested in step 315, such as through entry of "" or receipt of an incoming message from the network 104, then the method proceeds to step 335. When a non-telephony mode has not been requested in step 315, the method proceeds to request or set up a telephony call, such as generating DTMF tones and connecting an audio path between the user's telephone and the network 104, step 320, followed by entering the transparent telephony mode and transmitting audio (typically PCM) data to the network 104, step 325. The audio data will have been PCM encoded by the user audio interface 255, and will have been transformed into an appropriate digital or analog format (e.g., ISDN, POTS, etc.) by the network interface 110 for transmission to the network 104. When the telephony call is terminated, step 330, the method may end, return step 350.

Continuing to refer to FIG. 3, when a non-telephony mode has been requested in step 315, the method proceeds to step 335 and initializes and enters an operating mode corresponding to the selected media application. For example, for a selected video conference application, the multimedia control method will initialize and enter the video conference mode, such as by playing an initial speech prompt as discussed above. Next, in step 340, the method performs the requested service such as, for example, for video conference mode, collecting a video input request type and originating a video conference call using a directory, updating a video conference call directory, manually originating a video conference call, muting an input (audio or video), providing loop back (e.g., local self-view such as monitoring or other surveillance), playing help or error messages or menu options, or exiting the video conferencing control system. For other modes, the requested service may include selecting a digital video channel for viewing, descrambling an analog video channel for viewing, or initiating an AC power line signaling interface command to raise or lower a temperature setting. In step 345, when the requested media application service is terminated, such as by going on hook in a video call, the method may end, return step 350.

In summary, FIGS. 1 through 3 disclose an apparatus for multimedia control (101 or 201), with the apparatus comprising, first, a network interface 110, the network interface 110 coupleable to a first communication channel 103 for communication with a network 104; second, a user interface 120, the user interface 120 responsive to receive a first control signal of a plurality of control signals; third, a plurality of media application modules 140, each media application module 140 of the plurality of media application modules 140 coupleable to a corresponding medium 145 of a plurality of corresponding media 145; and fourth, a processor arrangement 130, the processor arrangement 130 coupled to the network interface 110, to the user interface 120 and to the plurality of media application modules 140, the processor arrangement 130 having a plurality of operating modes, the processor arrangement 130 responsive, through a set of program instructions and in response to the first control signal, to select a first media application module 140 of the plurality of media application modules 140, to enter a first operating mode of the plurality of operating modes, the first operating mode corresponding to the first media application module 140, the processor arrangement further responsive, in conjunction with the first media application module, to control the corresponding medium 145.

Also in summary, the method embodiment of the present invention may also be stored as a set of program instructions. As a consequence, an embodiment of the present invention also includes a data storage device, such as a memory or a disk, readable by a processor arrangement 130 in a multimedia control apparatus (101 or 201), the storage device encoding processor executable instructions for multimedia control, with the data storage device comprising, first, instruction means for selecting a first media application of a plurality of media applications (FIG. 3, steps 305, 310 and 315); second, instruction means for entering a first operating mode of a plurality of operating modes, the first operating mode corresponding to the first media application (FIG. 3, steps 335 or 320); and third, instruction means for controlling a first medium of a plurality of media, the first medium corresponding to the first media application (FIG. 3, steps 340 or 325).

Numerous advantages from the various multimedia control apparatuses 101 and 201, and from the various multimedia control systems 100 and 200, are readily apparent. First, the various multimedia control apparatuses, in accordance with the present invention, provide a singular (or integrated) apparatus and method capable of providing diverse multimedia control functions. In the preferred embodiment, the multimedia control apparatus provides for control over a plurality of media applications including telephony, video conferencing, analog video, digital video, voice mail, and AC power line signaling (for control over premise or subscriber equipment such as HVAC, lighting, security, and entertainment). As a consequence, a user does not need to learn many different sets of commands or menus to operate a plurality of disparate multimedia applications; instead, a user may utilize a single device, such as a telephone located anywhere within the user premises, to control all applications throughout the premises.

Another particularly innovative feature of the various apparatus and system embodiments of the present invention is the "tri-ality" of the use of a telephone 150 in the preferred embodiment for telephony (POTS), for audio input and output (for video, CACS, ISDN or POTS), and for multimedia control (for selecting video conferencing, other video modes, other multimedia modes, or telephony modes). Another related significant feature of the present invention is the ability of any connected telephone 150 in the user's premises to have such a "tri-ality" of functionality, by virtue of being connected to the multimedia control apparatus via typical premise telephone wiring. Any connected telephone, including portable telephones and speaker phones, becomes a multimode telephone, providing the physical interface for telephony functions, for audio functions, and for multimedia control functions. Such multimedia control may be both mobile and available from a plurality of locations within a user's premises. As a consequence, the user is not confined to a single location, such as at a PC, a dedicated control panel, or in a dedicated conference room, for multimedia control capability. In addition, the system may be configured as needed for additional locations, for example, simply by adding or removing telephones or other physical interfaces.

Yet another significant feature of the preferred embodiment of the present invention is the transparency of telephony operation, such that a user need not be aware of the multimedia capability to place or receive a telephone call. In addition, in accordance with the preferred embodiment, the multimedia control system utilizes equipment typically found in consumers' homes or premises, such as existing telephones, and for video applications, existing televisions and video cameras or camcorders. The preferred embodiment also avoids device redundancy, eliminating multiple user interfaces, displays, and control systems and panels. As a consequence, the system may be implemented at relatively low cost, especially compared to the currently available PC-based or stand alone multimedia systems. Moreover, the system of the present invention is user friendly, easy to install and use, avoids device or equipment redundancy, and should be relatively less expensive for in-home purchase and use by consumers.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An apparatus for multimedia control, the apparatus comprising:
   a network interface, the network interface coupleable to a first communication channel for communication with a network;
   a user interface, the user interface responsive to selectively receive a first control signal of a plurality of control signals or an audio signal;
   a plurality of media application modules, each media application module of the plurality of media application modules coupleable to a corresponding medium of a plurality of corresponding media; and
   a processor arrangement, the processor arrangement coupled to the network interface, to the user interface and to the plurality of media application modules, the processor arrangement having a plurality of operating modes, the processor arrangement responsive, through a set of program instructions and in response to the first control signal, to select a first media application module of the plurality of media application modules, to enter a first operating mode of the plurality of operating modes, the first operating mode of the plurality of operating modes, the first operating mode corresponding to the first media application module, the processor arrangement further responsive, in conjunction with the first media application module, to control the corresponding medium.

2. The multimedia control apparatus of claim 1, wherein the processor arrangement is further responsive to select a telephony media application module, of the plurality of media application modules, in the absence of the first control signal designating a non-telephony media application module of the plurality of media application modules.

3. The multimedia control apparatus of claim 1, wherein the processor arrangement is further responsive to generate and transmit to the user interface a plurality of user prompt signals, each user prompt signal of the plurality of user prompt signals corresponding to a media application module of the plurality of media application modules.

4. The multimedia control apparatus of claim 3, wherein the user interface is further responsive to receive the first control signal as a selection responsive to the plurality of user prompt signals.

5. The multimedia control apparatus of claim 1, wherein the plurality of media application modules includes telephony control, video conferencing control, digital video control, analog video control, audio/video entertainment control, HVAC control, lighting control, security control, and appliance control.

6. The multimedia control apparatus of claim 1, wherein the user interface is further coupleable to a physical interface for entry of the first control signal.

7. The multimedia control apparatus of claim 6, wherein the physical interface is a telephone.

8. The multimedia control apparatus of claim 1, wherein the network interface is an ISDN interface.

9. The multimedia control apparatus of claim 1, wherein the network interface is an POTS telephony interface.

10. The multimedia control apparatus of claim 1, wherein the network interface is a cable network interface.

11. A method for multimedia control, the method comprising:
   (a) selecting a first media application of a plurality of media applications;
   (b) entering a first operating mode of a plurality of operating modes, the first operating mode corresponding to the first media application; and
   (c) controlling a first medium of a plurality of media, the first medium corresponding to the first media application.

12. The method for multimedia control of claim 11, wherein step (a) further comprises selecting a telephony media application in the absence of an express selection of a non-telephony media application of the plurality of media applications.

13. The method for multimedia control of claim 12, wherein the selection of the telephony media application is user transparent.

14. The method for multimedia control of claim 11, wherein step (a) further comprises generating a plurality of user prompt signals, each user prompt signal of the plurality of user prompt signals corresponding to a media application of the plurality of media applications.

15. The method for multimedia control of claim 14, wherein step (a) further comprises receiving a first control signal, of a plurality of control signals, as a selection responsive to the plurality of user prompt signals.

16. The method for multimedia control of claim 11, wherein the plurality of media applications includes telephony control, video conferencing control, digital video control, analog video control, audio/video entertainment control, HVAC control, lighting control, security control, and appliance control.

17. An apparatus comprising:
   a multimode telephone, the multimode telephone coupleable to a multimedia control apparatus for communication with a network via a first communication channel, the multimode telephone having a plurality of operating modes, the plurality of operating modes including:
      a first operating mode in which the multimode telephone operates in a first media application, of a plurality of media applications, for audio telephony communication with the network; and
      a second operating mode in which the multimode telephone operates for entry of a first control signal of a plurality of control signals for selection and control of a second media application of the plurality of media applications, the second media application being a non-telephony media application.

18. The apparatus of claim 17 wherein the multimode telephone is mobile.

19. A data storage device readable by a processor arrangement in a multimedia control apparatus, the storage device encoding processor executable instructions for multimedia control, the data storage device comprising:
   instruction means for selecting a first media application of a plurality of media applications;
   instruction means for entering a first operating mode of a plurality of operating modes, the first operating mode corresponding to the first media application; and
   instruction means for controlling a first medium of a plurality of media, the first medium corresponding to the first media application.

20. The data storage device of claim 19, further comprising instruction means for selecting a telephony media application, of the plurality of media applications, in the absence of an express selection of a non-telephony media application of the plurality of media applications.

21. The data storage device of claim 19, further comprising instruction means for generating a plurality of user prompt signals, each user prompt signal of the plurality of user prompt signals corresponding to a media application of the plurality of media applications.

22. The data storage device of claim 21, further comprising instruction means for receiving a first control signal, of a plurality of control signals, as a selection responsive to the plurality of user prompt signals.

23. An apparatus comprising:
   a processor arrangement having a plurality of operating modes, the plurality of operating modes including:
      a first operating mode in which the processor arrangement operates in a first media application of a plurality of media applications, for audio telephony communication with a telecommunications network; and
      a second operating mode in which the processor arrangement, in response to a first control signal of a plurality of control signals, operates in a second media application of the plurality of media applications, the second media application being a non-telephony media application.

24. The apparatus of claim 23, wherein the processor arrangement is responsive to select the first operating mode in the absence of the first control signal.

25. The apparatus of claim 23, wherein the processor arrangement is responsive to generate a plurality of user prompt signals, each user prompt signal of the plurality of user prompt signals corresponding to a media application of the plurality of media applications.

26. The apparatus of claim 25, wherein the processor arrangement is further responsive to the first control signal as a selection responsive to the plurality of user prompt signals.

27. The apparatus of claim 23, wherein the plurality of media applications includes telephony control, video conferencing control, digital video control, analog video control, audio/video entertainment control, HVAC control, lighting control, security control, and appliance control.

28. The apparatus of claim 23, wherein the processor arrangement further comprises:
   a microprocessor; and
   a memory coupled to the microprocessor.

29. A distributed graphical user interface comprising:
   a physical audio interface, the physical audio interface responsive to an entry of a plurality of control signals;
   a video display, the video display responsive to generate a first graphical display, of a plurality of graphical displays, from a first video signal of a plurality of video signals; and
   a multimedia control apparatus coupled to the physical audio interface and to the video display via at least one communication channel, the multimedia control apparatus having a processor arrangement responsive, through a set of program instructions and in response to a first control signal of the plurality of control signals, to generate the first video signal, the multimedia control apparatus further having a modulator to transmit the first video signal to the video display via the at least one communication channel.

30. The distributed graphical user interface of claim 29, wherein the physical interface is a telephone.

31. The distributed graphical user interface of claim 29, wherein the physical interface is mobile.

32. The distributed graphical user interface of claim 29, wherein the video display is a television.

33. The distributed graphical user interface of claim 29, wherein the processor arrangement of the multimedia control apparatus is further responsive, through the set of program instructions and in response to a second control signal of the plurality of control signals, to generate a second video signal of the plurality of video signals, the modulator responsive to transmit the second video signal to the video display, and wherein the video display is further responsive to generate a second graphical display, of the plurality of graphical displays, from the second video signal.

* * * * *